United States Patent
Nakashima et al.

(10) Patent No.: US 6,862,699 B2
(45) Date of Patent: Mar. 1, 2005

(54) APPARATUS FOR TESTING FUNCTIONS OF COMMUNICATION APPARATUS

(75) Inventors: Wataru Nakashima, Fukuoka (JP); Kano Asada, Fukuoka (JP); Wataru Nakamura, Fukuoka (JP); Eitatsu Yoshida, Fukuoka (JP); Yoshihisa Matsumoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 666 days.

(21) Appl. No.: 09/817,326

(22) Filed: Mar. 26, 2001

(65) Prior Publication Data

US 2002/0059545 A1 May 16, 2002

(30) Foreign Application Priority Data

Nov. 10, 2000 (JP) ........................................ 2000-343466

(51) Int. Cl.$^7$ ................................................ G06F 11/00
(52) U.S. Cl. ...................................................... 714/701
(58) Field of Search ................................ 714/712, 715, 714/743; 370/245, 249; 375/225

(56) References Cited

U.S. PATENT DOCUMENTS 5,477,531 A * 12/1995 McKee et al. ............... 370/249
6,625,764 B1 * 9/2003 Dawson ....................... 714/715

* cited by examiner

*Primary Examiner*—Shelly A Chase
(74) *Attorney, Agent, or Firm*—Katten Muchin Zavis Rosenman (57) ABSTRACT

A testing apparatus for testing a packet switch includes one of a test packet transmitting part and a test packet receiving part or both. The test packet transmitting part includes a test packet generating part generating a test packet, and a transmit control part that controls the test packet generating part in accordance with a timing defined by a format of packet. The test packet receiving part includes a test packet checking part for checking the address and test data contained in the test packet, and a receive control part for controlling the test packet checking part in accordance with the timing defined by the format of packet.

6 Claims, 11 Drawing Sheets

APPARATUS FOR TESTING FUNCTIONS OF COMMUNICATION APPARATUS

BACKGROUND OF THE INVENTION

1. Field of the Invention

The present invention generally relates to an apparatus for testing the functions of a communication apparatus. More particularly, the present invention is concerned with an apparatus that is connected to a network such as a local area network (LAN) capable of transmitting a variable-length packet and tests the functions of a packet switch capable of routing a packet in accordance with a destination address.

2. Description of the Related Art

In a connectionless type network, a sender terminal sends to a receiver terminal a packet (or frame) having transmission data to which a header including a destination address and a source address is added. A network performs a routing control of the received packet in accordance with the destination address included in the packet and transfers the packet to the receiver terminal. A packet switch, which may be used to construct a repeater, a router or a switching hub is connected to the network controls to transfer the packet (or frame) in accordance with the destination address.

Figure 1:
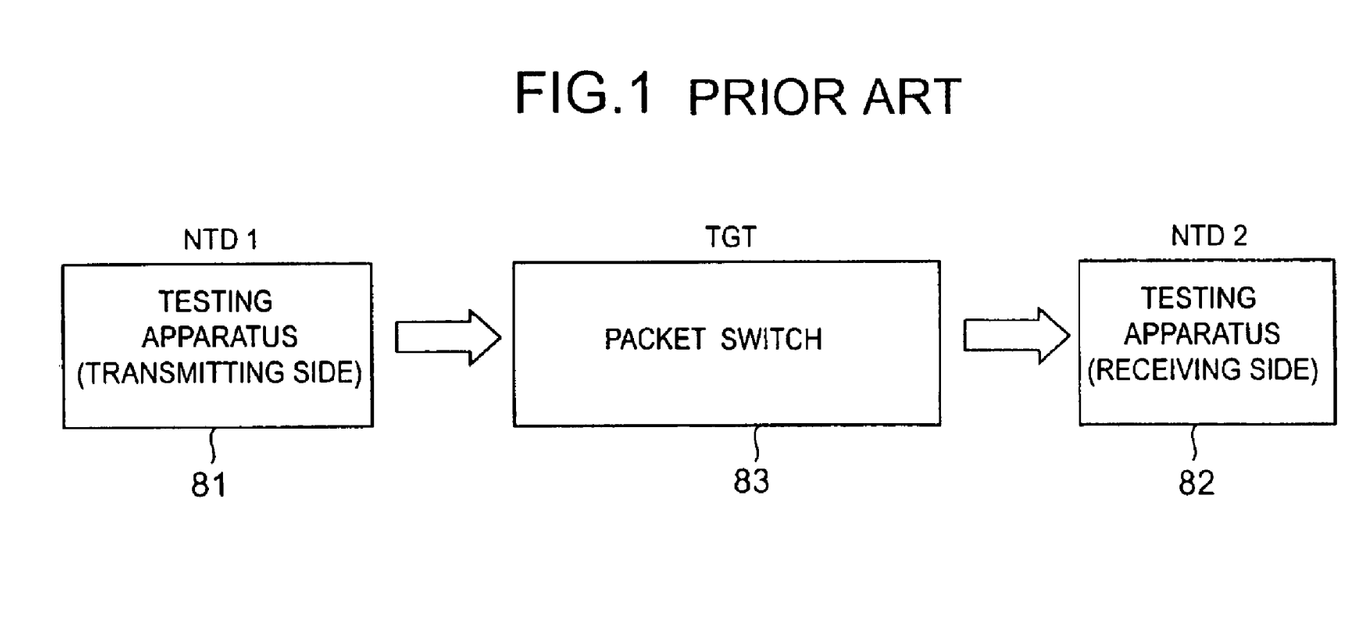
FIG. 1 is a block diagram of a testing system.

The packet switch or the network including the same is tested as follows. Referring to FIG. 1, a testing apparatus (NTD1) 81 on the transmitting side, and a testing apparatus (NTD2) 82 on the receiving side are prepared. A packet switch (TGT) 83 or a network including it is connected to the testing apparatuses 81 and 82 as a testee subject. The testing apparatus 82 sends a packet including test data to the packet switch 83, which transfers the packet to the testing apparatus 82 on the receiving side. The testing apparatus 82 checks whether the packet switch 83 or the network including it has the predetermined functions. For example, the testing apparatus 82 checks the header and test data and counts the number of packets that are received during the unit time. The testing apparatuses 81 and 82 may be accommodated in a single casing.

Figure 2:
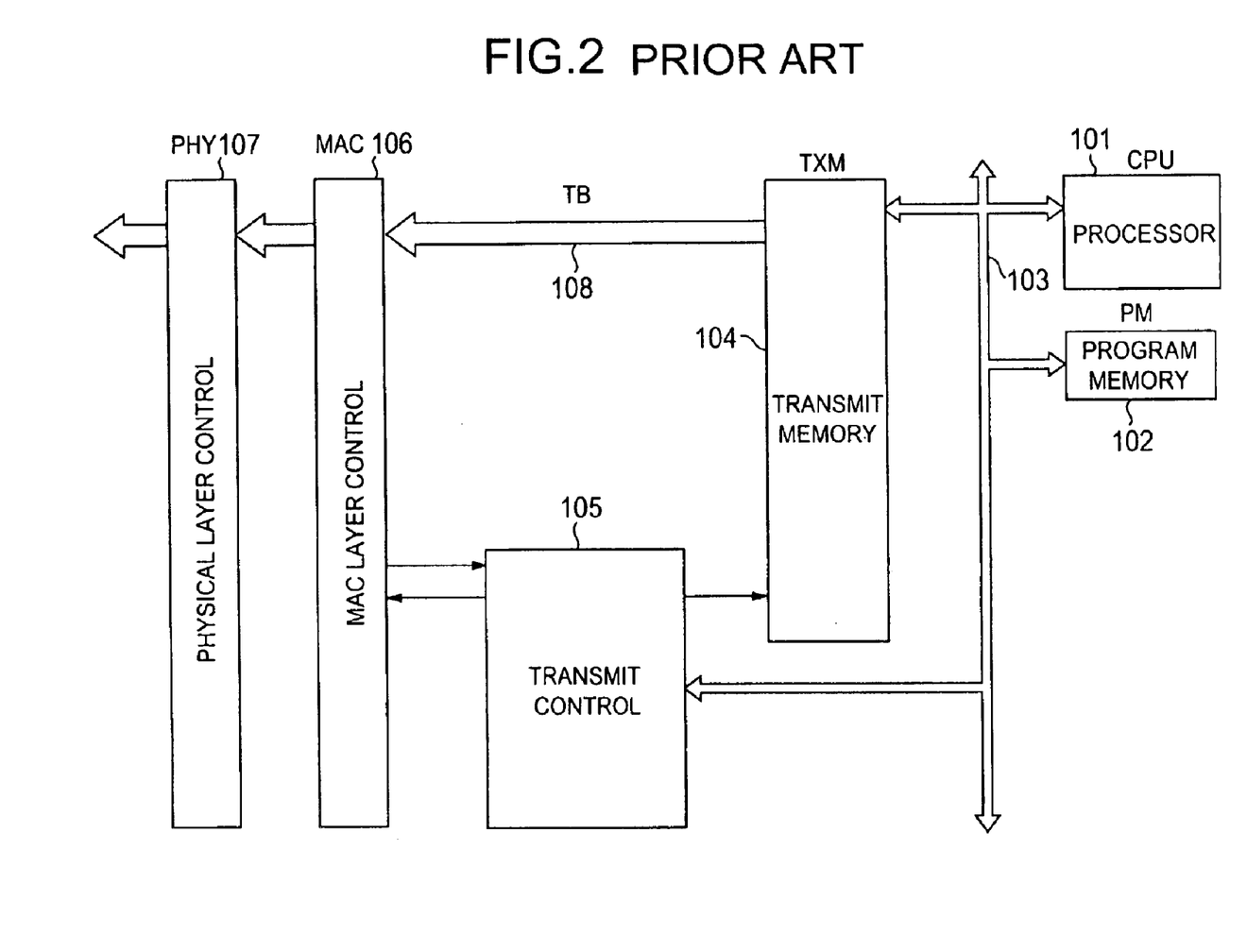
FIG. 2 is a block diagram of a conventional test packet transmitting part.

A test packet transmitting unit, which corresponds to the testing apparatus on the transmitting side, is configured as shown in FIG. 2. The test packet transmitting unit is made up of a processor (CPU) 101, a program memory (PM) 102, a CPU bus 103, a transmit memory 104, a transmit control circuit 105, a MAC (Media Access Control) layer control part (MAC) 106, a physical layer control part (PHY) 107, and a transmit bus (TB) 108.

The processor 101 writes a test packet into the transmit memory 104 in accordance with a program stored in the program memory 102. The test packet includes a header field containing a transmission destination address, a transmission source address, and a data field containing test data. Then, the processor 101 instructs the transmit control circuit 105 to send the test packet. The transmit control circuit 105 reads the test packet including the test data from the transmit memory 104 in response to the instruction from the processor 101. Then, the circuit 105 sends, via the MAC layer control part 106 and the physical layer control part 107, the test data to a packet switch or a network including it in accordance with a format that conforms to the packet switch or network.

Each time the processor 101 reads the test packet from the transmit memory 104 and sends it under the control of the transmit control circuit 105, the processor 101 changes the destination address and the contents of the test data, and writes test data thus changed into the transmit memory 104. Then, the processor 101 instructs the transmit control circuit 105 to send the changed test data. The above operation is repeated so that a plurality of kinds of test packets can be sent out.

Figure 3:
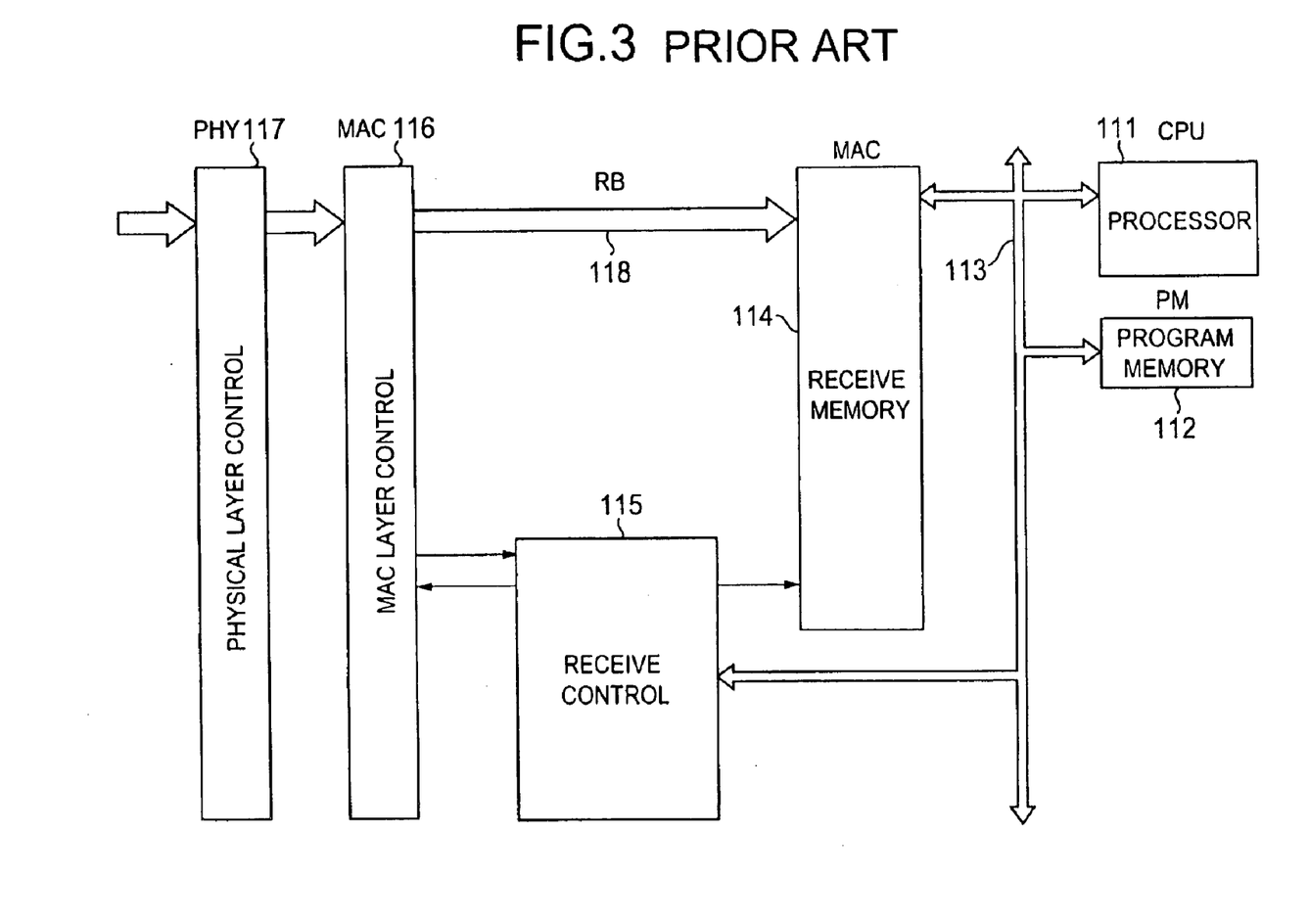
FIG. 3 is a block diagram of a conventional test packet receiving part.

A test packet receiving unit, which corresponds to the testing apparatus on the receiving side, is configured as shown in FIG. 3. The test packet receiving unit is made up of a processor (CPU) 111, a program memory (PM) 112, a CPU bus 113, a receive memory (RXM) 114, a receive control circuit 115, a MAC layer control part (MAC) 116, a physical layer control part (PHY) 117, and a receive bus (RB) 118.

The received packet is written into the receive memory 114 via the physical layer control part 117 and the MAC layer control part 116. At this time, the receive control circuit 115 controls to write the packet in the receive memory on the basis of a beginning-of-packet signal and an end-of-packet signal from the MAC layer control part 116. When the writing of the packet is completed, the receive control circuit 115 informs the processor 111 of the end of the writing. Then, the processor 111 performs the predetermined checking process. For example, the processor 111 checks the header field and the test data.

Nowadays, Ethernet versions having bit rates of 100 Mbps, 1 Gpbs and 10 Gbps are practically used to transmit various data at higher speed. Correspondingly, the packet switch is urged to operate at higher speed. A packet switch having a large number of ports is known. There is also known a packet switch capable of performing a packet repeating operation on all the ports at the respective bit rates. This packet switch has the transmitting and receiving functions called full-wire function.

As the personal computers and the Internet come into wide use, a larger number of terminals is connected to the network and a larger amount of various data is transmitted. It is required to evaluate whether the packet switch connected to the network has given performance. It is desired to test the packet switch having the full-wire function while changing any one or ones of the destination address, the source address, the pattern of data, and the packet length.

Therefore, it is required that the testing apparatus that tests the packet switch or the network including it has the function of testing the full-wire function, which may include a path-through/communication confirming function, an overload testing function, a performance measuring function, an ensured band testing function, and a long-term running test function.

However, the conventional testing apparatus has the following disadvantages. In the test packet transmitting part shown in FIG. 2, the destination address and test data are written into the transmit memory 104, and are read therefrom under the control of the transmit control circuit 105. If a single packet having a pattern is repeatedly read from the transmit memory 104 and is sent, the packets will be transmitted at a relatively high speed. However, in contrast, if the protocol header or the test data is updated each time the packet is sent, the contents of the transmit memory 104 must be rewritten. For example, the Giga-bit Ethernet requires the rewriting process that should be completed for a limited time of about 96 ns, which separates one packet from another. However, there is no means for performing such high-speed rewriting. Even if such means is realized, it will be very expensive. Consequently, it can be said that the conventional testing device cannot perform the overload test and the ensured-band test of the packet switch with the full-wire function.

The test packet receiving part shown in FIG. 3 has the following disadvantages. The received packet is once written into the receive memory 114. Then, it is checked whether the packet in the receive memory 114 has normally been received and is checked whether the test data is normal. In the Giga-bit Ethernet, it is required that packets each having the minimum packet length of 64 bytes (including the frame check sequence) are received in the full-wire fashion, each packet must be written into and read from the receive memory 114 and must be checked by the processor 111 for a limited time approximately equal to 600 ns per packet. In practice, it is very difficult to perform the above process for the limited time. Therefore, the conventional testing apparatus is capable of testing the packet switch only when it has a relatively light load.

As described above, the conventional apparatus for testing the packet switch can test only the test of transmitting packets at a relatively low bit rate. Generally, the conventional testing device is equipped with the function of checking whether the number of transmitted packets is equal to the number of received packets. At low bit rates, the conventional testing apparatus may perform test data normality check. In short, the conventional testing apparatus cannot sufficiently test high-bit-rate packet switches and networks including these switches.

Generally, the packet switch that is actually connected to a network has the function of sending out a special packet at given intervals to a terminal or another switch connected to the network at given intervals in order to conform the normality of the terminal or another switch. This requires that the testing apparatus has the same function as described above. However, the conventional testing apparatus is not equipped with the function of sending the special packet because it does not have the function of checking the maximum transmission band of the packet switch for high-bit-rate transmission.

SUMMARY OF THE INVENTION

It is a general object of the present invention to provide a testing apparatus in which the above disadvantages are eliminated.

A more specific object of the present invention is to provide a testing apparatus capable of performing an overload test and an ensured band test and capable of inserting and sending a single special packet during transmission of test packets in full-wire fashion.

The above objects of the present invention are achieved by a testing apparatus having a function of sending a packet having a header field including an address and a data field including data, said testing apparatus comprising: a test packet transmitting part generating test data and sending the test data included in the data field. The test packet transmitting part includes a test packet generating part and a transmit control part. The test packet generating part includes: an address outputting unit that outputs an updated address to be described in the header field in accordance with a setting value; and a data outputting unit that outputs fixed or updated test data to be included in the data field in accordance with another setting value. The transmit control part includes a controller that places the address in the header field in accordance with a format of the packet and placing the test data in the data field.

The above objects of the present invention are also achieved by a testing apparatus receiving a packet having a header field including an address and a data field including data to be transmitted and performing a predetermined test, said testing apparatus comprising: a test packet receiving part receiving a packet from a packet switch or a network and checking the packet. The test packet receiving part includes a test packet checking part and a receive control part. The test packet checking part includes a check unit checking the address in the header field and test data in the data field. The receive control part includes a control unit causing the test data checking part to perform check operation at a timing based on a format of the packet.

The above objects of the present invention are also achieved by a testing apparatus transmitting a packet having a header field including an address and a data field including data to be transmitted and sending the packet in accordance with a predetermined protocol, said testing apparatus comprising: a test packet generating part and a transmit control part. The test packet generating part includes: a first output unit outputting data including address data to be placed in the header field; a second output unit outputting data including test data to be placed in the data field; and a selector selecting one of the first and second output units. The transmit control part controls the selector so that the packet that conforms to the predetermined protocol can be output.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 4:
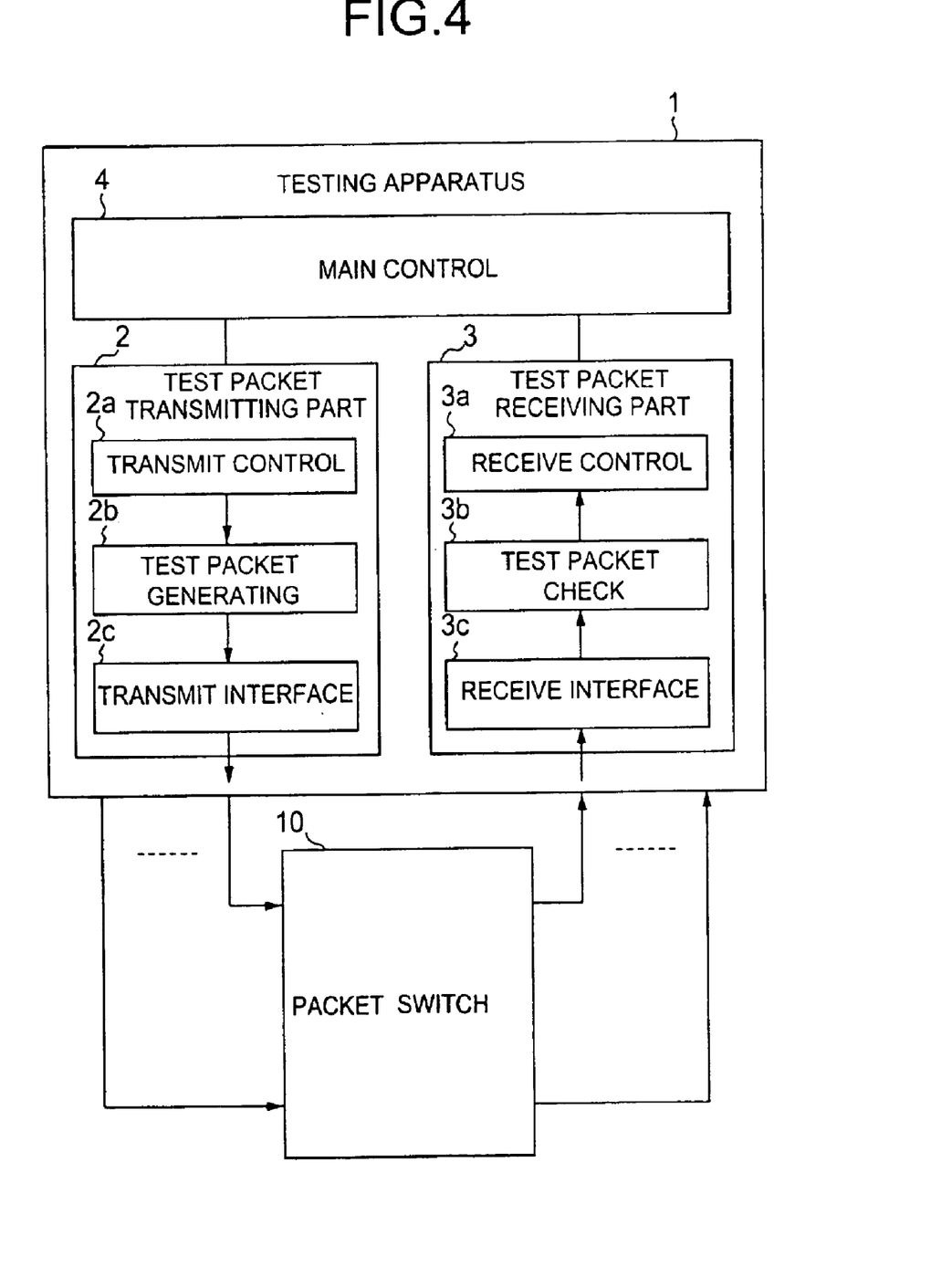
FIG. 4 is a block diagram illustrating the principle of the present invention.

FIG. 4 is a block diagram illustrating the principle of the present invention. Referring to FIG. 4, a testing apparatus 1 includes a test packet transmitting part 2, a test packet receiving part 3, a main control part 4, a transmit control part 2a, a test packet generating part 2b, a transmit interface part 2c, a receive control part 3a, a test packet checking part 3b, and a receive interface part 3c. The testing apparatus 1 tests a packet switch 10. The testing apparatus 1 is also capable of testing a network including the packet switch 10.

A packet is made up of data and an address added to the data. Such a packet corresponds to a frame in the Ethernet. In the present specification, the term "packet" has the concept of packet itself and something called frame. A test packet is a packet that contains test data in the data field.

The testing apparatus 1 is configured so that the main control part 4 controls the test packet transmitting part the test packet receiving part 3. The test packet transmitting part 2 includes the test packet generating part 2b, the transmit control part 2a, and the transmit interface part 2c. The test packet receiving part 3 includes the test packet checking part 3b, the receive control part 3a, and the receive interface part 3c. The testing apparatus 1 tests the packet switch 10 having a plurality of input/output ports, which are connected to the testing apparatus 1 by cables. The testing apparatus 1 includes, for each of the above input/output ports, a group of the test packet transmitting part 2 and the test packet receiving part 3. In the case of FIG. 4, the test packet transmitting parts 2 are connected to the input/output ports on one side of the packet switch 10 by cables, and the test packet receiving parts are connected to the input/output ports on the other side thereof by cables. Packets applied to the input/output ports on one side of the packet switch can be transferred to those on the other side.

If the testing apparatus 1 is used to perform the overload test of the packet switch 10 or the network including it, the testing apparatus 1 may include the test packet transmitting part 2 only. Alternatively, the testing apparatus 1 may include only the test packet receiving part 3, if the testing apparatus 1 is used to receive packets from the packet switch 10 or the network including it and to perform given test items such as measurement of the transmission error rate and ensured band test based on the number of packets that have been received per unit time.

The test packet generating part 2b of the test packet transmitting part 2 includes the function of generating the transmission destination address that falls within a given range at high speed, and the function of generating test data of a given data length at high speed. The test packet generating part 2b generates the test packet that includes the header field containing the source and destination addresses, and the data field including test data.

The test packet checking part 3b of the test packet receiving part 3 has the function of checking the address in the header field of the test packet received via the receive interface part 3c, and the function of checking the test data contained in the data field. The results of the respective checks are transferred to the main control part 4, which causes a monitor to display the results, or to a personal computer, which executes a given process such as a totaling process or a display process.

Figure 5:
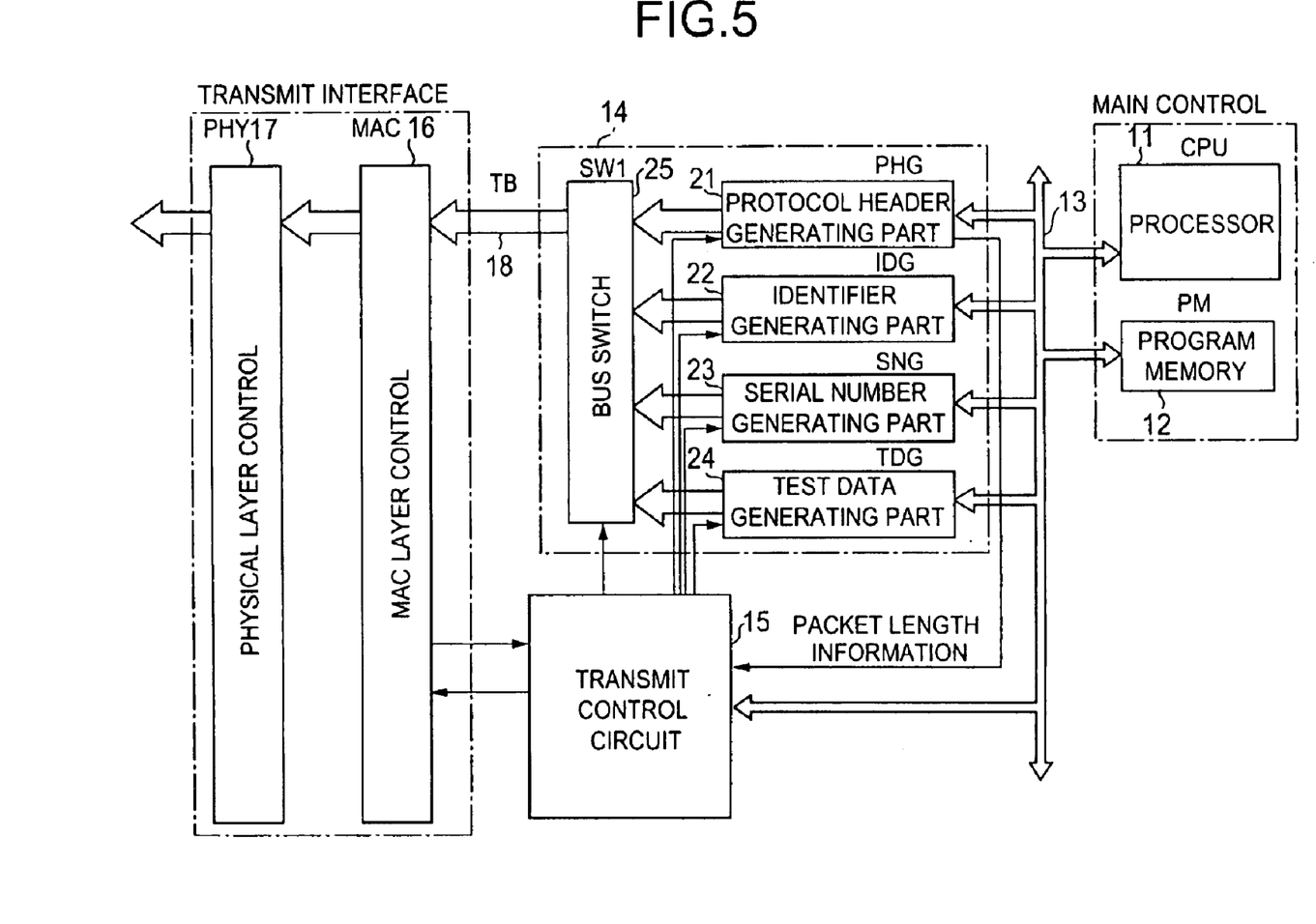
FIG. 5 is a block diagram of a test packet transmitting part according to an embodiment of the present invention.

FIG. 5 is a block diagram of the test packet transmitting part 2 according to an embodiment of the present invention. The test packet transmitting part 2 includes a processor (CPU) 11, a program memory (PM) 12, a CPU bus 13, a test packet generating part 14, a transmit control circuit 15, a MAC layer control part (MAC) 16, a physical layer control part (PHY) 17, a transmit bus (TB) 18, a protocol header generating part (PHG) 21, an identifier generating part (IDG) 22, a serial number generating part (SNG) 23, a test data generating part (TDG) 24, and a bus switch circuit (SW1) 25.

The test packet generating part 14 corresponds to the test packet generating part 2b shown in FIG. 4, and the transmit control circuit 15 corresponds to the transmit control part 2a shown in FIG. 4. The MAC layer control part 16 and the physical layer control part 17 correspond to the transmit interface part 2c shown in FIG. 4. The processor 11 corresponds to the main control part 4 shown in FIG. 2. The protocol header generating part 21 serves as a first output means or unit. The identifier generating part 22, the serial number generating unit 23 and the test data generating part 24 form a second output means or unit. A test packet generating part includes the bus switch circuit 25 serving as a selector means or unit. The transmit control circuit 15 serves as a transmit control means or unit.

The processor 11 controls the parts in accordance with a program stored in the program memory 12, and sets initial values in the test packet generating part 14 via the CPU bus 13. Further, the processor 11 instructs the transmit control circuit 15 to send the test packet. The initial values may be initial values of the transmission source and destination addresses that are processed by the protocol header generating part 21. In addition, the processor 11 sets the range within which the source and destination addresses can be changed. The processor 11 sets a fixed test packet identifier in the identifier generating part 22. Alternatively, a variable test packet identifier may be included in the packet.

The serial number generating part 23 additionally includes a serial number in the test packet containing test data associated with the destination address, and sets the number of destination addresses. The test data generating part 24 has the function of generating any of pseudo-random data, increment data (its value serially increments) and decrement data (its value serially decrements). One of the pseudo-random data, increment data and decrement data can be used as test data. The above-mentioned initial values may be set by a personal computer, which is not illustrated for the sake of simplicity.

The transmit control circuit 15 receives a test start instruction via the CPU bus 13. Then, in accordance with a predetermined timing sequence for the bus switch circuit 25, the circuit 15 instructs the identifier generating part 22, the serial number generating part 23, and the test data generating part 24 to generate the transmission source and destination addresses, the serial numbers, and test packets, respectively. Then, the transmit control circuit 15 assembles these items of data into a test packet. Thereafter, the circuit 15 transfers the test packet thus assembled to the MAC layer control part 16 from the bus switch circuit 25 via the transmit bus 18. The control part 16 additionally includes check data such as a frame check sequence (FCS) in the test packet, which is sent via the physical layer control part 17, to a packet switch or a network including it (not shown for the sake of simplicity).

Gate circuits such as tri-state gates may be provided in the protocol header generating part 21, the identifier generating part 22, the serial number generating part 23 and the test data generating part 24. The transmit control circuit 15 controls the gate circuits in accordance with a predetermined timing sequence similar to that for the bus switch circuit 25. With the structure, the test packet including test data can be transferred to the MAC layer control part 16.

Figure 6A:
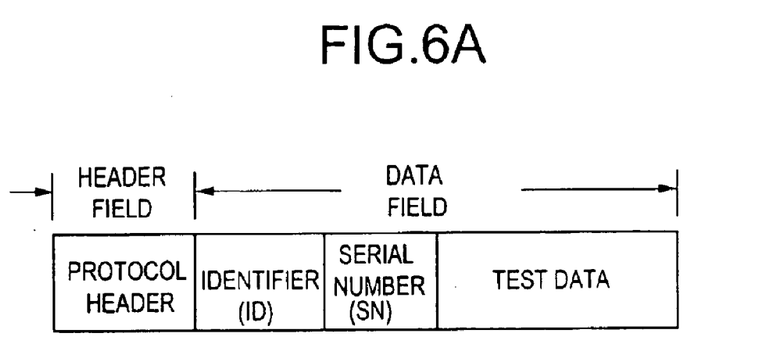
FIGS. 6A and 6B are diagrams of a test packet.
Figure 6B:
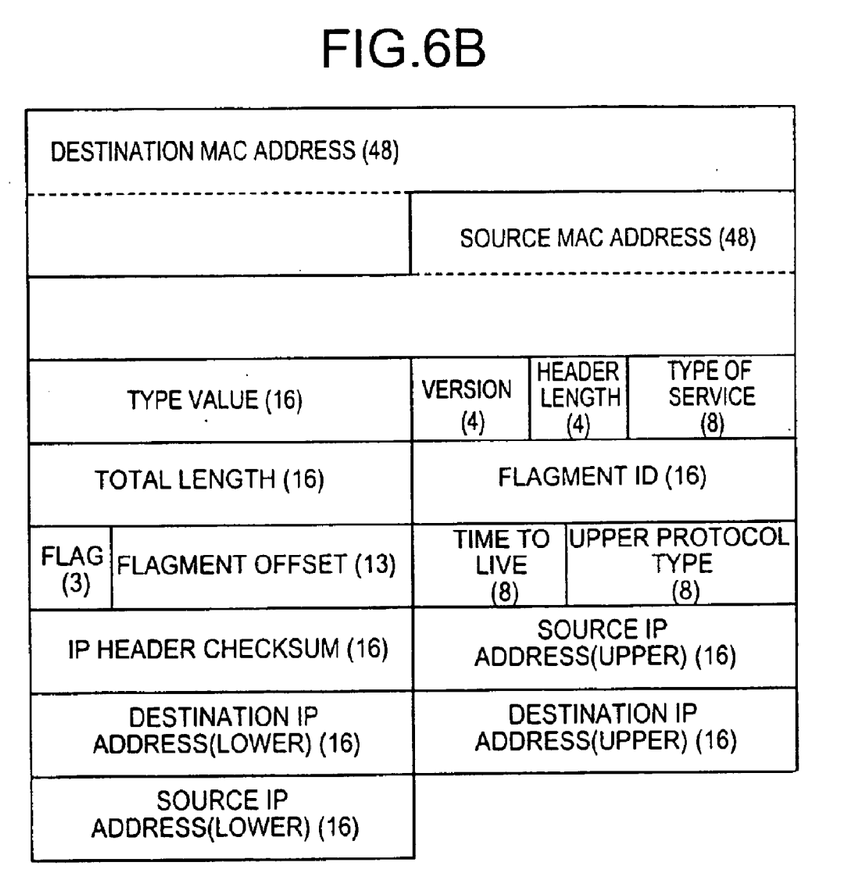

FIG. 6A illustrates a format of the test packet, and FIG. 6B is a format of the IP protocol header. As shown in FIG. 6B, the IP protocol header includes, as a MAC address, a destination MAC address, a source MAC address, a type value (identifying value), version, a header length, a type of service, total length of the IP packet, a fragment ID, a flag, a flagment offset, time to live, an upper protocol type, IP header checksum, a source IP address, and a destination IP address. The source IP address is indicated so as to be separated into the upper and lower addresses. Similarly, the destination IP address is indicated so as to be separated into the upper and lower addresses. The numeral number in each parenthesis indicates the number of bits. The protocol header can be generated by the protocol header generating part 21.

The data field shown in FIG. 6A includes an identifier (ID), a serial number (SN), and test data. The identifier can be generated by the identifier generating part 22 shown in FIG. 5. The serial number can be generated by the serial number generating part 23. The test data can be generated by the test data generating part 24. The test data may have an arbitrary length within a given range.

Figure 7:
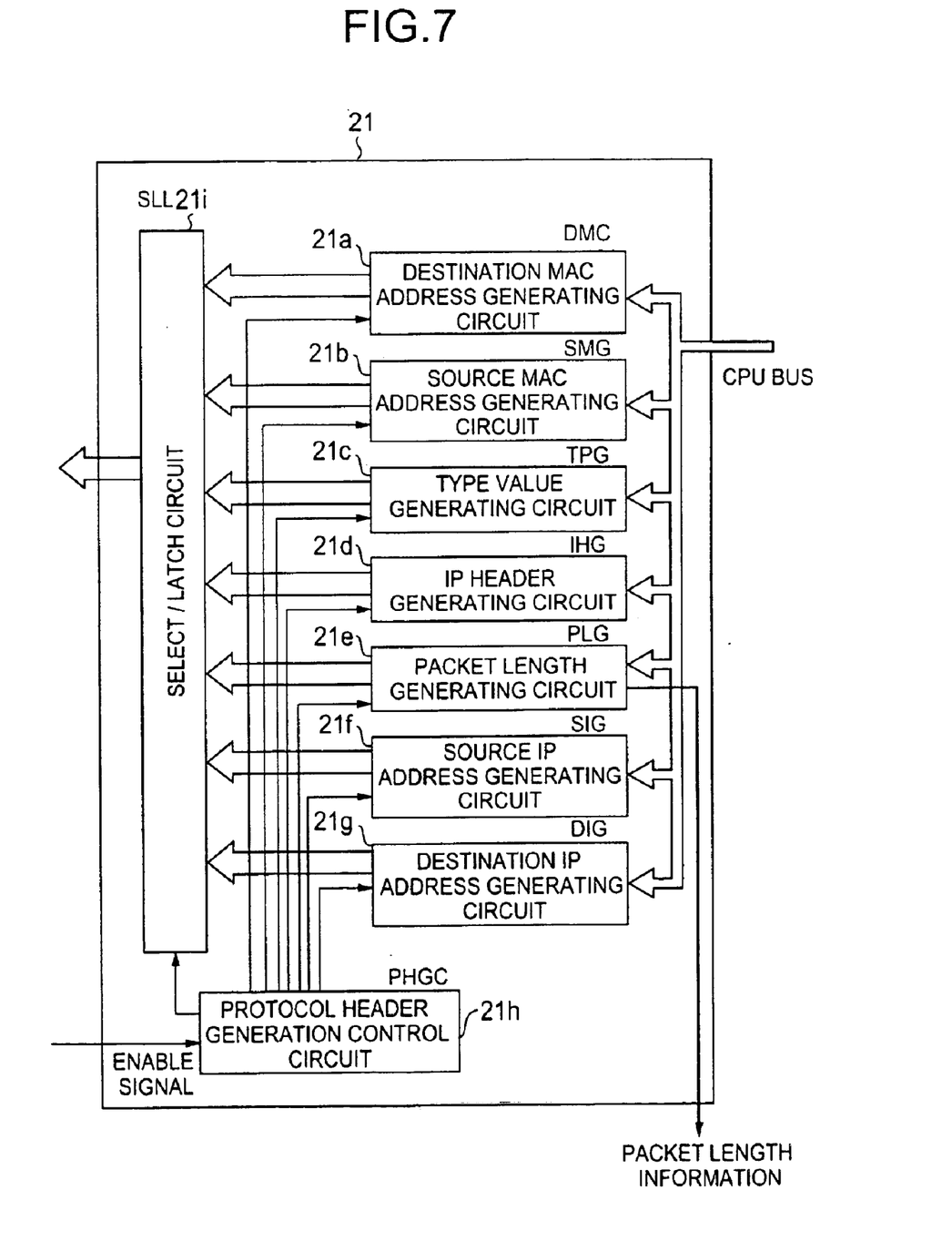
FIG. 7 is a block diagram of a protocol header generating part.

FIG. 7 is a block diagram of the protocol header generating part 21, which includes a destination MAC address generating circuit (DMG) 21a, a source MAC address generating circuit (SMG) 21b, a type value (pointer) generating circuit (TPG) 21c, an IP header generating circuit (IHG) 21d, a packet length generating circuit (PLG) 21e, a source IP address generating circuit (SIG) 21f, a destination IP address generating circuit (DIG) 21g, a protocol header generation control circuit (PHGC) 21h, and a selection/latch circuit (SLL) 21i.

The generating circuits 21a through 21g of the protocol header generating part 21 generate corresponding values of the parameters in the format of the protocol header shown in FIG. 6B. Initial values and operation modes are set in the generating circuits 21a through 21g by the processor 11 via the CPU bus 13. The generating circuits 21a through 21g operate in accordance with the respectively initial values and the operation modes. When transmission is initiated, the processor 11 sends a transmission start instruction to the transmission control circuit 15 shown in FIG. 5. The transmit control circuit 15 sends an enable signal to the protocol header generating circuit 21. Then, the protocol header generation control circuit 21h controls the timings of the generating circuits 2a through 21g in accordance with the format of the protocol header shown in FIG. 6B. Further, the protocol header generation control circuit 21h controls the timing of the selection/latch circuit 21I. Thus, address data that conforms to the format of the protocol header is sent to the bus switch circuit 25 shown in FIG. 5.

Figure 8:
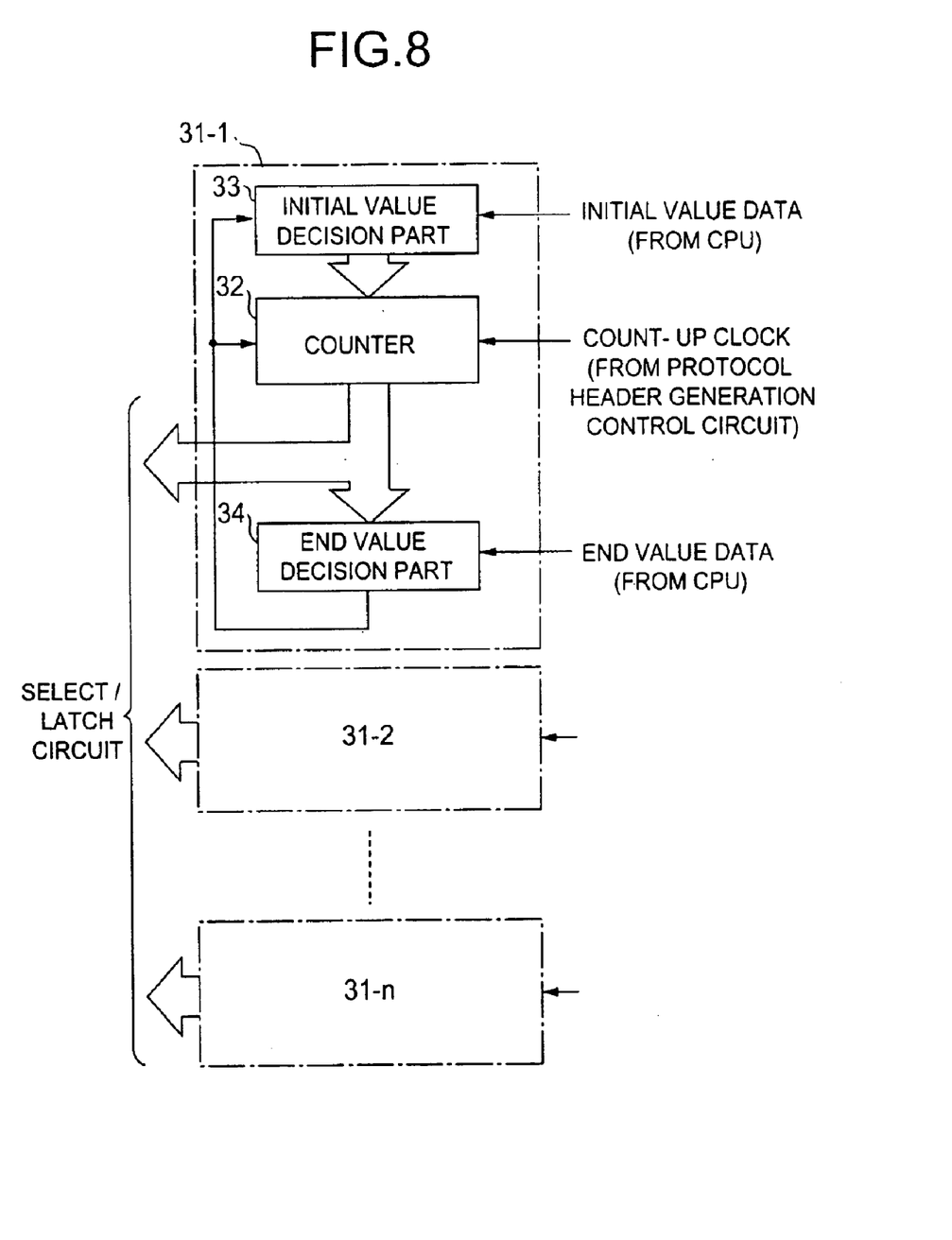
FIG. 8 is a block diagram illustrating a mechanism for generating an address.

FIG. 8 is a diagram illustrating a mechanism for generating an address. Referring to FIG. 8, there are provided address unit parts 31-1 through 31-n, each of which includes a counter 32, an initial value setting part 33 that may include a register, and an end value decision part 34 that may include a register and a comparator. For example, each of the destination MAC address and the source MAC address shown in FIG. 6B consists of six bytes. Each of the source IP address and the destination IP address consists of four bytes. These IP addresses conform to IP version 4. In IP version 6, each of the source IP address and the destination IP address consists of 16 bytes.

The address unit parts 31-1 through 31-n may be configured in such a way as to correspond to units of byte or the types of address such as the source and destination MAC addresses. For example, assuming that the address unit part 31-1 is configured so as to correspond to the destination MAC address consisting of six bytes, the counter 32 should output six-byte destination MAC address. The first destination MAC address supplied from the processor 11 via the CPU bus 13 is set in the initial value setting part 33 as initial value data. The last destination MAC address is set in the end value decision part 34 as end value data.

The initial value data in the initial value setting part 33 is set as the initial value of the counter 32, which counts up in synchronism with a count-up clock signal based on the timings of sending packets. The count-up clock signal is supplied from the protocol header generation control circuit 21h. The count value of the counter 32 is compared with the end value data by the end value decision part 34. If both the values coincide with each other, the counter 32 is cleared and the initial value data from the initial value setting part 33 is set. Then, the counter 32 starts the count-up operation again.

The count value of the counter 32 is transferred to the bus switch circuit 25 as the destination MAC address. Thus, the destination MAC address that falls within the setting range is updated at high speed each time the packet is sent. The source MAC address is sent similarly. Further, the destination IP address and the source IP address are generated in the same manner as described above. As compared to the method of repetitively updating the address while the address is written into the memory and read therefrom, the address that falls within the desired range is serially generated at high speed.

The packet length generating circuit 21egenerates, for each packet, a value indicating the total length of the packet including the IP packet header. This value is sent to the selection/latch circuit 21i. The same value as the above-mentioned value is output to the transmit control circuit 15 (FIG. 5) as packet length information. The value is once latched in the transmit control circuit 15. At the time of controlling the test data generating circuit 24, the transmit control circuit 15 controls, based on the value latched therein, the length and number of enable signals to be sent to the test data generating circuit 24 so that the total length described in the protocol header is consistent with the length of the packet that is actually sent to the transmission path. The value that is output by the packet length generating part 21e may be varied (generated at random, incremented or decremented) for each packet rather than the fixed value as in the case of the aforementioned destination MAC address. In this case, the transmit control circuit 15 is notified, as packet length information, of the value of the total length that varies on the packet basis. Thus, the packets can duly be sent to the transmission path.

The identifier makes it possible to check, on the receive side, whether the packet received is a packet sent from the apparatus on the transmission side. Generally, there is no need to change the identifier on the packet basis. Thus, the identifier generating part 22 may be formed of a register that stored a fixed value set by the processor 11. The fixed value in the register can be sent to the bus switch circuit 25 under the control of the transmit control circuit 15.

The serial number generating part 23 places the serial number in the test packet of the same address, and may be made up of a single or a plurality of counters. A single counter increments its count value when the counter 32 shown in FIG. 8 counts the end value. In a case where only the destination MAC address is updated and output within the setting range, the counter value thus obtained may be the serial number that corresponds to the destination MAC address. The count value may be incremented on the packet basis.

Figure 9:
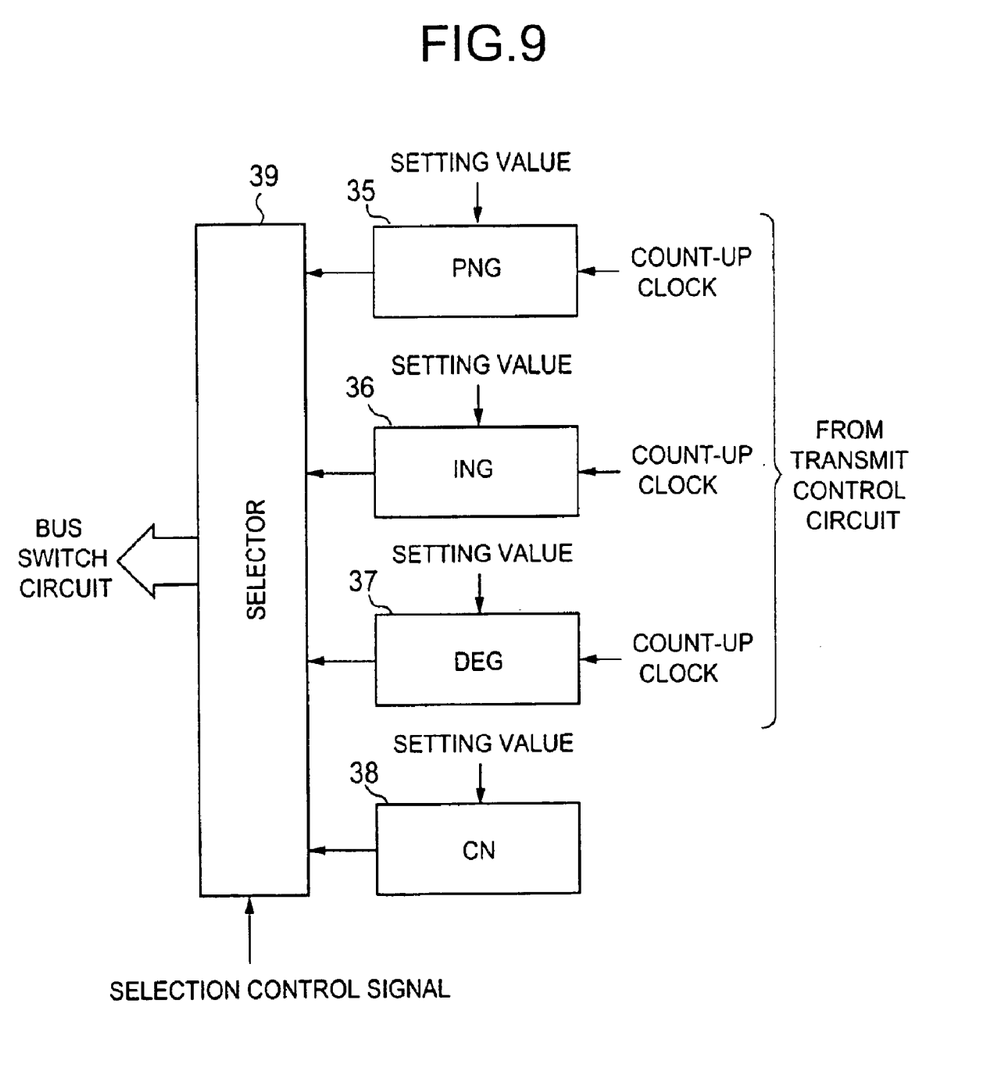
FIG. 9 is a block diagram of a test data generating part.

The test data generating part 24 can be configured as shown in FIG. 9. The test data generating part 24 is made up of at least one of a pseudo-random data generator (PNG) 35, an increment data generator (ING) 36, a decrement data generator (DEG) 37 and a fixed data setting part (CN) 38, and a selector 39. According to the type of test data, the setting values including the initial value and the end value are set to the generators 35–38 by the processor. The selector 39 is supplied with a selection control signal from the transmit control circuit 15, so that one of the generators 35–38 is selected in accordance with the type of test data. The count-up clock signal is supplied to the generators 35–37 from the transmit control circuit.

The pseudo-random generator 35 includes a shift register and a gate circuit, and is formed of any one of various types of generators. In this case, the variable data length is used. For example, it is possible to employ a configuration equipped with a selector that one of the outputs of the stages of the shift register operating in synchronism with a clock signal serving as the count-up clock signal. The increment data generator 36 is formed by an up counter, which counts up in accordance with the count-up clock. The count data is used as test data.

The decrement data generator 37 includes a down counter, which counts down from the setting value in accordance with a clock signal serving as the count up clock. The count value thus obtained is test data. The data length of test data generated by either the increment data generator 36 or the decrement data generator 37 can be determined by selection of the number of bits based on the setting value. Alternatively, the increment data generator 36 and the decrement data generator 37 may be incorporated into an up/down counter, which counts up or down.

The pseudo-random data generator 35, the increment data generator 36 and the decrement data generator 37 are supplied with appropriate clock CLK when these generators are changed each time the test packet is sent. The clock CLK may be controlled so that different pseudo-random data, increment data or decrement data is output each time the destination address serially changes and returns to the original address in circulation fashion.

The fixed data setting part 38 may be formed of a register in which fixed test data supplied from the processor 11 is set as the setting value. The set data is included in test data in the data field of the packet. When the test data is changed, new test data is supplied from the processor 11 and is written into the fixed data setting part 38.

The count-up clock supplied to the test data generating part 24 shown in FIG. 9 from the transmit control circuit 15 is controlled in accordance with the packet length information output to the transmit control circuit 15 from the protocol header generating part 21 so that the correct data length is added to the total IP packet length in the protocol header. This equalizes the total IP packet length in the protocol header to the real packet length.

Figure 10:
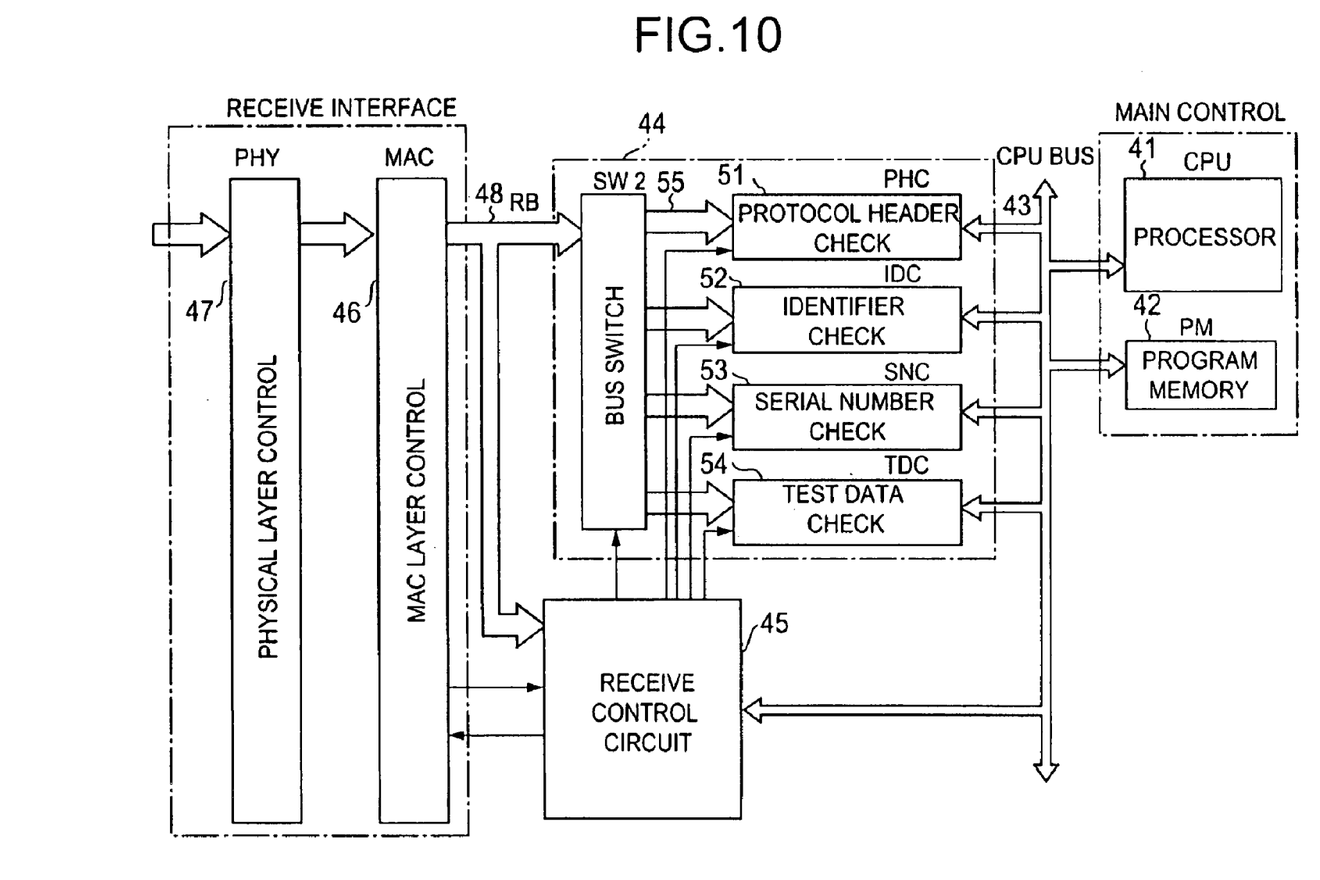
FIG. 10 is a block diagram of a test packet receiving part according to an embodiment of the present invention.

FIG. 10 is a circuit diagram of the test packet receiving part according to an embodiment of the present invention. The test packet receiving part is made up of a processor (CPU) 41, a program memory (PM) 42, a CPU bus 43, a test packet checking part 44, a receive control circuit 45, a MAC layer control part (MAC) 46, a physical layer control part (PHY) 47, a receive bus (RB) 48, a protocol header checking part (PHC) 51, an identifier checking part (IDC) 52, a serial number checking part (SNC) 53, a test data checking part (TDC) 54, and a bus switch circuit (SW2) 55.

The receive packet checking part 44 corresponds to the receive packet checking part 3b shown in FIG. 4. The receive control circuit 45 corresponds to the receive control part 3a shown in FIG. 4. The processor 41 corresponds to the function of the main control part 4 shown in FIG. 4. The functions of the MAC layer control part 46 and the physical layer control part 47 correspond to the receive interface part 3c shown in FIG. 4.

The test packet that contains test data from a packet switch or a network including it (not shown) is transferred to the test packet checking part 44 and the receive control circuit 45 via the physical layer control part 47 and the MAC layer control part 48. The receive control circuit 45 analyzes the protocol of packets on the receive bus 48. The start signal that indicates the beginning of the packet identified by the MAC layer control part 48 and the end signal that indicates the end thereof are applied to the receive control circuit 45. The processor 41 controls the parts in accordance with a program stored in the program memory 42. At the commencement of test, values corresponding to test items are set in the test packet checking part 44.

The receive control circuit 45 controls the bus switch circuit 55 at the timings based on the format of packets in response to the start signal indicative of the beginning of the packet. Thus, the protocol header in the header field is supplied to the protocol header check part 51, and the identifier of the subsequent data part is supplied to the identifier checking part 52. Further, the serial number is supplied to the serial number checking part 53, and the test data is supplied to the test data checking part 54. The end of the test packet can be discriminated by the protocol analysis in the receive control circuit 45 or the stop signal indicative of the end of the packet from the MAC layer control part 46. That is, the variable test data can be supplied to the test data checking part 54.

Each of the checking parts is supplied with the corresponding item of testing the packet switch from the processor 41, and performs the specified test item. Then, each checking part notifies the processor 41 of the results of the totaling process for the check results and an error if detected. The processor 41 performs a predetermined process using information supplied from the checking parts. For example, the protocol header checking part 51 may check whether a packet having the destination address specified has been received. The identifier checking part 52 may check whether the predetermined identifier has been added.

The serial number checking part 53 checks whether the serial number assigned to each packet is serially incremented. For example, the serial number checking part 53 may include a comparator, which compares the serial number of the previous packet with that of the current packet. The test data checking part 54 checks the test data in a checking manner suitable for the employed test data that is one of the pseudo-random data, the increment data, the decrement data and the fixed data.

The receive control circuit 45 counts up each time the start signal from the MAC layer control part 46 is received. The count value is transferred to the processor 41. The receive control circuit 45 controls switching of the bus switch circuit 55 and the checking operations of the checking parts in accordance with the timings of the format of the test packet. For example, the characteristic of the band ensured and the performance at the time of overload can be checked. The processor 41 can measure the error rate of the packet switch or the network including it on the basis of the error detection results obtained by the checking parts. Thus, it is possible to receive the packets from the packet switch having the full-wire function or the network including the switch and test the performance thereof.

Figure 11:
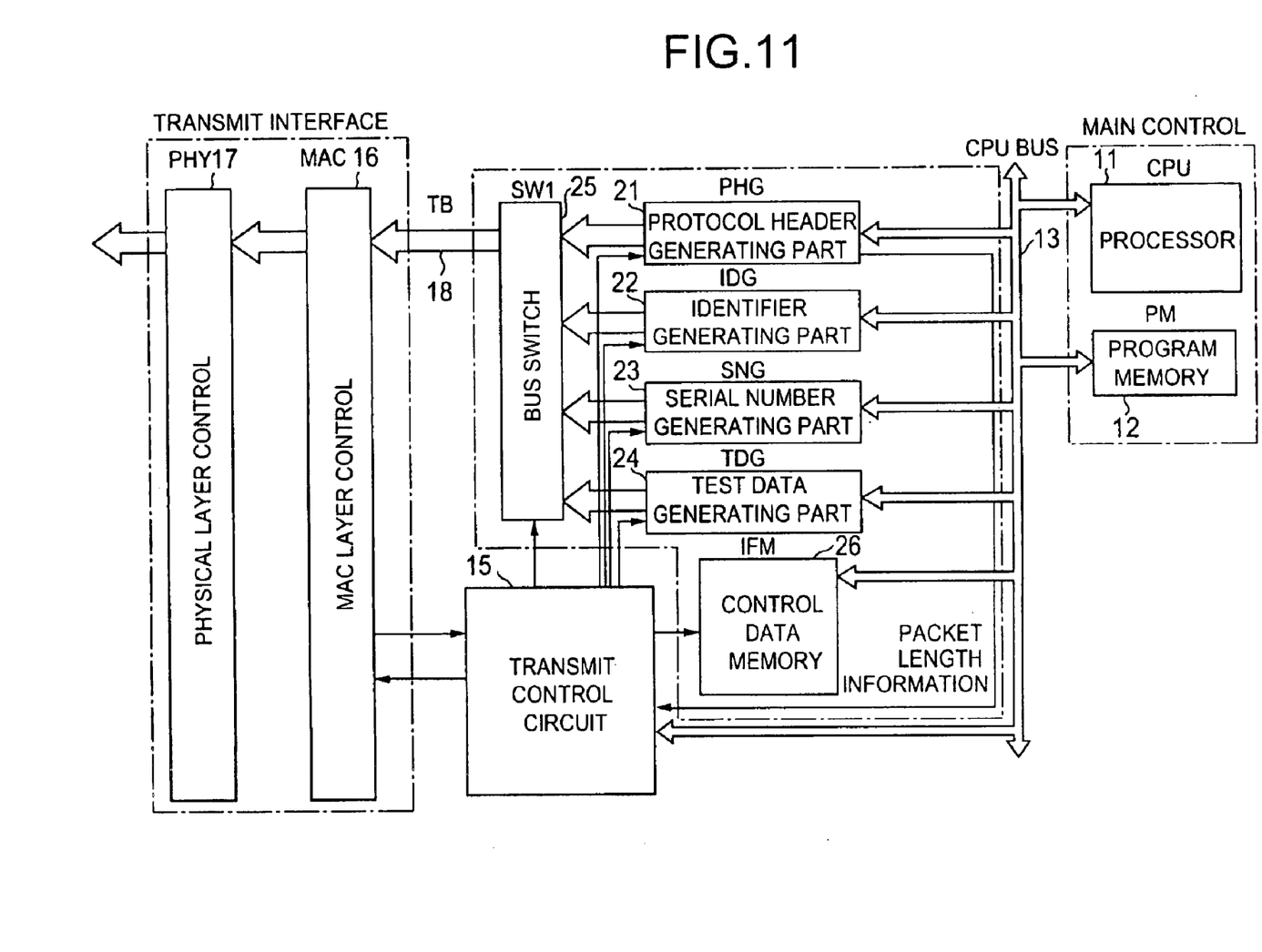
FIG. 11 is a block diagram of a test packet transmitting part including a control data transmitting function.

FIG. 11 is a block diagram of a test packet transmitting part that includes the function of transmitting control data according to an embodiment of the present invention. In FIG. 11, parts that are the same as those shown in FIG. 5 are given the same reference numbers. The test packet transmitting part includes a control data memory (IFM) 26. In some cases, the packet switch or the network including it may be required to transmit a control packet (control frame) that conforms to ARP (Address Resolution Protocol), a control packet (control frame) that conforms to an RIP (Routing Information Protocol), or a control packet that should be periodically sent and received in order to maintain network routing information and a particular communication. In other words, these packets are required to be periodically transmitted even in a case where the test packet including test data is transmitted to and received by the testing apparatus.

Taking the above into consideration, the control packet from the processor 11 is written into the control data memory 26 via the CPU bus 13. The transmit control circuit 15 controls to send the test packet with the test data placed therein. When the outputting of the test packet that is being generated in accordance with an instruction from the processor 11 is completed, the transmit control circuit 15 reads the control packet from the control data memory 26, and sends it to the transmit bus 18 via the bus switch circuit 25. Immediately after the control packet is output, the circuit 15 returns to the control of outputting the next test packet. More specifically, the control packet written into the control data memory 26 may be inserted and sent independently during continuous transmission of test packets with test data added. The other functional parts shown in FIG. 11 are the same as corresponding those shown in FIG. 5.

A testing apparatus in which the test packet transmitting part 2 and the test packet receiving part 3 are incorporated may be modified so that the processor 11 shown in FIG. 2 and the processor 41 shown in FIG. 9 are unified so as to realize the functions of the main control part 4 shown in FIG. 4.

The present invention is not limited to the specifically disclosed embodiments, and variations and modifications may be made without departing from the scope of the present invention. For example, the protocol header generating part may update only the destination address at high speed. In this case, only the destination MAC address generating circuit 21a (see FIG. 7) is provided, and the other generating parts output the fixed values.

The present application is based on Japanese Priority Patent Application No. 2000-343466 filed on Nov. 11, 2000, the entire contents of which are hereby incorporated by reference.

What is claimed is:

1. A testing apparatus having a function of sending a packet having a header field including an address and a data field including data, said testing apparatus comprising:

a test packet transmitting part generating test data and sending the test data included in the data field, the test packet transmitting part comprising a test packet generating part and a transmit control part, the test packet generating part comprising:

an address outputting unit that outputs an updated address to be described in the header field in accordance with a setting value; and a data outputting unit that outputs fixed or updated test data to be included in the data field in accordance with another setting value, the transmit control part comprising a controller that places the address in the header field in accordance with a format of the packet and placing the test data in the data field.

2. The testing apparatus as claimed in claim 1, wherein:

the test packet generating part comprises a protocol header generating part, an identifier generating part, a serial number generating part, and a test data generating part;

the protocol header generating part comprises a unit that updates an address within a range defined by initial value data and end value data each time one packet is sent;

the test data generating part comprises an output unit that outputs pseudo-random data, increment data, decrement data and fixed data, each having a respective data length based on an associated setting value.

3. The testing apparatus as claimed in claim 1, further comprising a control data memory that stores a predetermined control packet that is required to be periodically sent, the transmit control part sending the predetermined control packet read from the control data memory after sending the packet including the test data.

4. A testing apparatus receiving a packet having a header field including an address and a data field including data to be transmitted and performing a predetermined test, said testing apparatus comprising:

a test packet receiving part receiving a packet from a packet switch or a network and checking the packet, the test packet receiving part including a test packet checking part that checks the address in the header field and test data in the data field and a receive control part that causes the test data checking part to perform check operation at a timing based on a format of the packet.

5. A testing apparatus transmitting a packet having a header field including an address and a data field including data to be transmitted and sending the packet in accordance with a predetermined protocol, said testing apparatus comprising:

a test packet generating part and a transmit control part, the test packet generating part comprising:

a first output unit that outputs data including address data to be placed in the header field;

a second output unit that outputs data including test data to be placed in the data field; and a selector selecting one of the first and second output units, the transmit control part controlling the selector so that the packet that conforms to the predetermined protocol can be output.

6. The testing apparatus as claimed in claim 4, wherein:

the test packet checking part includes a protocol header checking part, an identifier checking part, a serial number checking part, and a test data checking part; and the receive control part controls check operations at timings based on the format of the packet received.

* * * * *